United States Patent
Ghodsi-Khameneh et al.

(10) Patent No.: US 8,339,001 B2
(45) Date of Patent: Dec. 25, 2012

(54) ELECTRONICALLY COMMUTATED MOTOR WITH NESTED RADIALLY STEPPED BUSBARS

(75) Inventors: Hassan Ghodsi-Khameneh, St. Georgen (DE); Alexander Hahn, Eigeltingen-Heudorf (DE); Reimund Weisser, Königsfeld-Erdmannsweiler (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 94 days.

(21) Appl. No.: 12/369,095

(22) Filed: Feb. 11, 2009

(65) Prior Publication Data

US 2009/0200879 A1    Aug. 13, 2009

(30) Foreign Application Priority Data

Feb. 12, 2008   (DE) .................. 10 2008 009 845

(51) Int. Cl.
*H02K 3/28* (2006.01)
*H02K 17/14* (2006.01)
*H02K 19/32* (2006.01)

(52) U.S. Cl. .................. 310/71; 310/68 R; 310/416
(58) Field of Classification Search .......... 310/71, 310/68 R; *H02K 3/46, 3/52, 3/28, 17/14, H02K 19/32*
See application file for complete search history.

(56) References Cited

U.S. PATENT DOCUMENTS

| 4,926,075 | A | * | 5/1990 | Fushiya et al. | 310/71 |
|---|---|---|---|---|---|
| 6,924,570 | B2 | * | 8/2005 | De Filippis et al. | 310/71 |
| 7,262,529 | B2 | | 8/2007 | Klappenbach | 310/71 |
| 2006/0138883 | A1 | * | 6/2006 | Yagai et al. | 310/71 |
| 2007/0170792 | A1 | * | 7/2007 | Bott et al. | 310/71 |
| 2007/0188030 | A1 | * | 8/2007 | Drubel et al. | 310/71 |

FOREIGN PATENT DOCUMENTS

| DE | 103 28 720 A | 1/2005 |
|---|---|---|
| EP | 1 642 376 A | 4/2006 |

* cited by examiner

*Primary Examiner* — Quyen Leung
*Assistant Examiner* — Michael Andrews
(74) *Attorney, Agent, or Firm* — Milton Oliver, Esq.; Oliver Intellectual Property LLC

(57) ABSTRACT

An electronically commutated motor has a rotor (34) that is rotatable about an axis (D), and it has a stator arrangement (30) in which is provided a number, evenly divisible by three, of salient stator poles that are wound with winding strands, associated with which, for the connection thereof, are busbars (44, 46, 48) arranged on edge. The latter are arranged in an insulating part (42). Each of these busbars (44, 46, 48) has a central portion (78), a first end portion (90) and a second end portion (56). These busbars (44, 46, 48) are insulated from one another and are nested into one another in a manner that minimizes relative displacement thereof.

4 Claims, 11 Drawing Sheets

US 8,339,001 B2

ELECTRONICALLY COMMUTATED MOTOR WITH NESTED RADIALLY STEPPED BUSBARS

CROSS-REFERENCE TO RELATED APPLICATION(S)

This application claims priority from German application 10 2008 009 845.0, filed 12 Feb. 2008, the disclosure of which is hereby incorporated by reference.

FIELD OF THE INVENTION

The present invention relates to an electronically commutated motor, and more particularly to one capable of fast start-up.

BACKGROUND

Electronically commutated motors that start within a very short time, and are consequently designed so that they enable high torque and have low internal resistance, are necessary in many applications.

SUMMARY OF THE INVENTION

It is therefore an object of the invention to make available a novel electronically commutated motor.

According to the invention, this object is achieved by a motor structure in which a rotor is rotatable about a central axis, a stator arrangement has a plurality of salient poles, whose number is divisible by 3, each pole has a coil thereon, and a plurality of busbars, arranged on edge in an insulating element, are provided for electrical connection of the stator coils. The busbars are nested together in such a way that relative circumferential movement thereof is mechanically limited or restrained. Such a motor has both a compact configuration and high torque, and is easy and economical to manufacture, especially in an automated manner.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
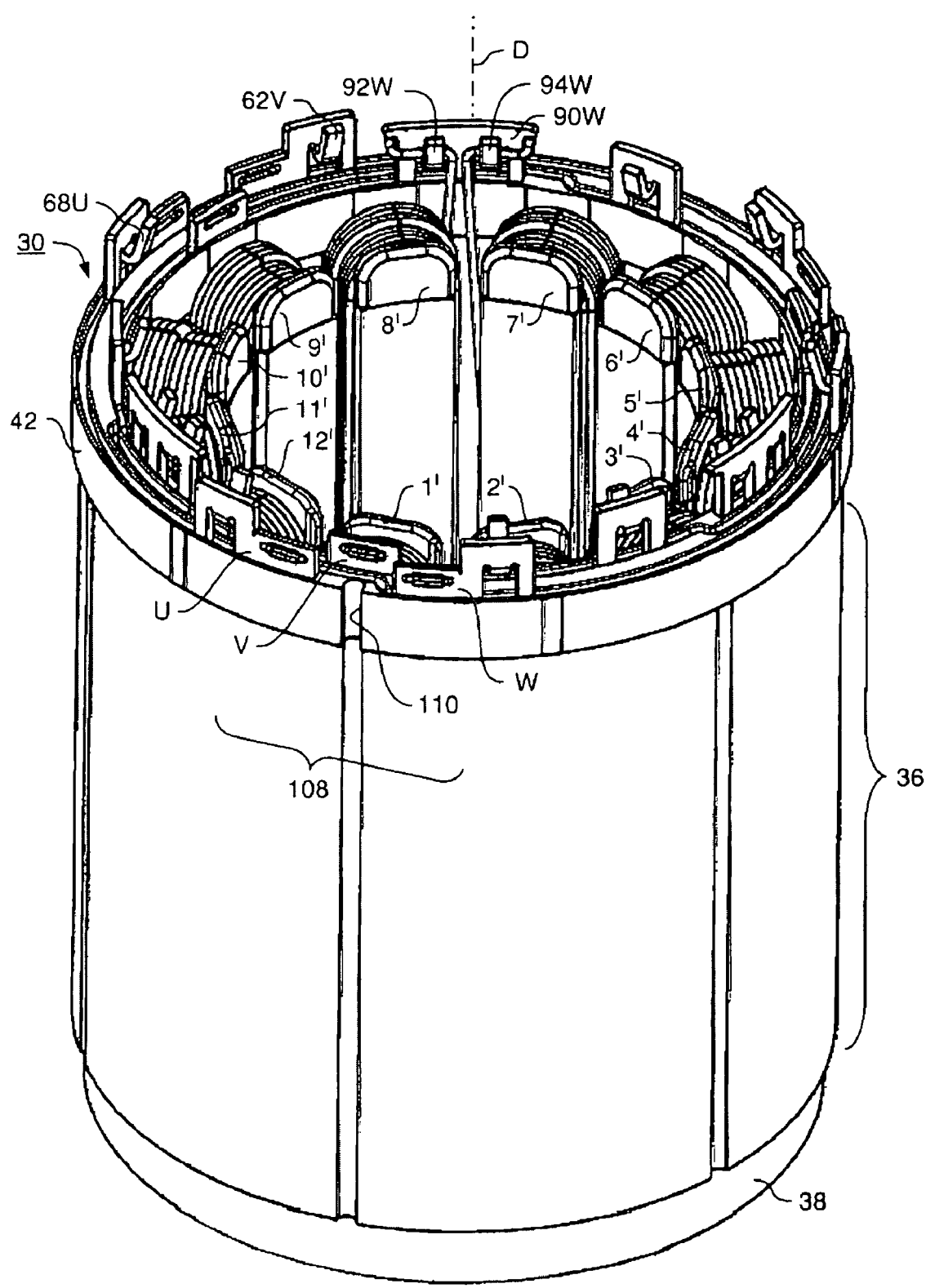
FIG. 1 depicts a wound stator lamination stack that is equipped on one end face with special busbars.
Figure 4:
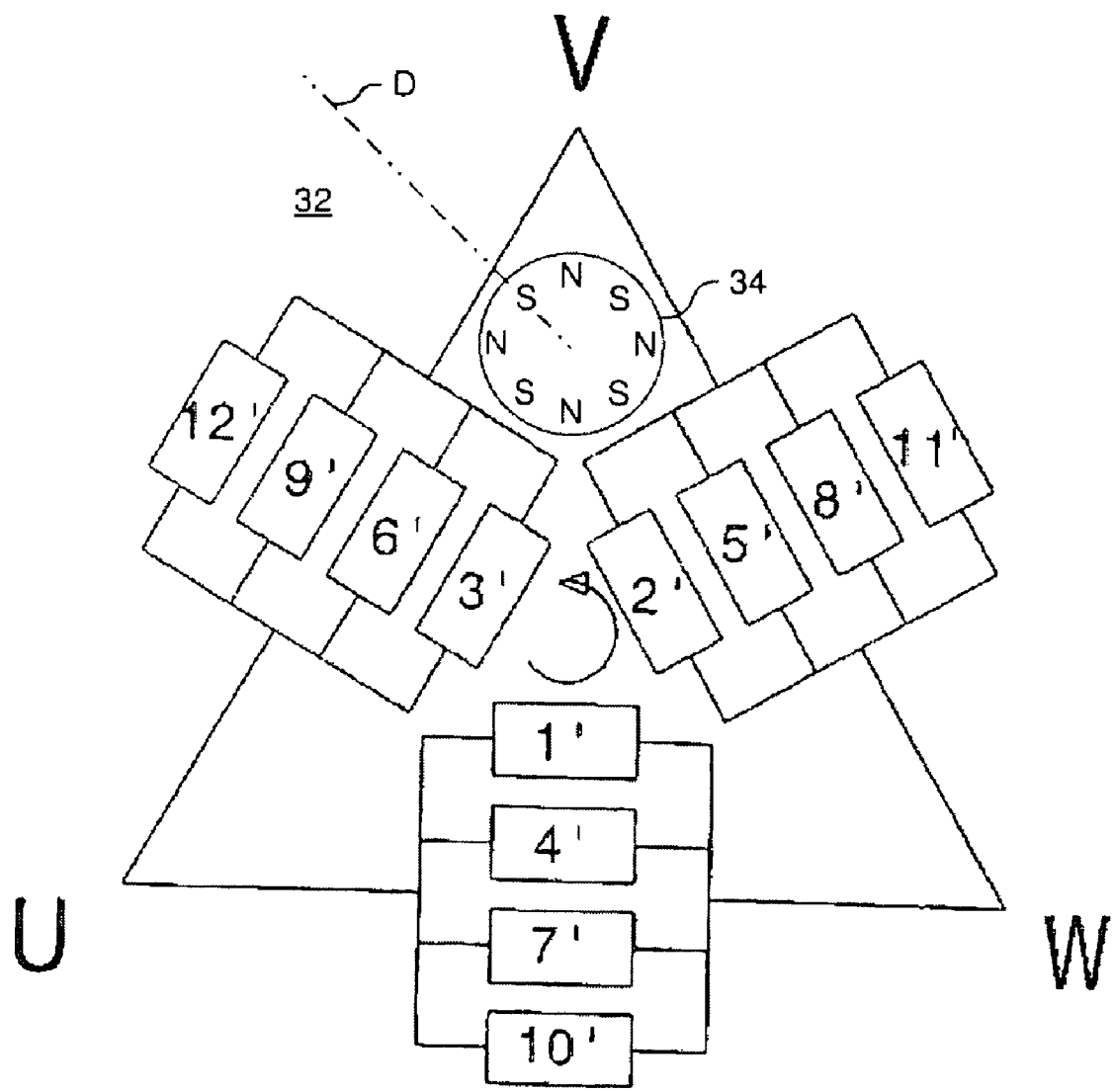
FIG. 4 shows, as an example, how the winding strands of FIG. 3 are interconnected into a multiple parallel delta winding.

FIG. 1 shows stator 30 of a three-phase motor 32 (FIG. 4), said motor having here, as an example, a permanent-magnet internal rotor 34 that is indicated only very schematically in FIG. 4 and of course can have a variety of configurations and numbers of poles depending on the design of motor 32, as is known to one skilled in the art of electrical machinery. An eight-pole rotor is depicted. Lamination stack 36 has twelve slots 1 to 12 that are insulated in the usual way, e.g. by means of a plastic coating (not depicted). These slots define twelve salient poles. Each pole is wound with a coil, and these coils are labeled 1' to 12'.

Stator 30 has, in the usual way, a lamination stack 36 on whose lower end (in FIG. 1) is mounted an insulating ring 38 that forms part of the winding body for the stator winding. This ring 38 is occasionally also referred to as an "end plate," and, in this embodiment, does not carry any electrical connecting elements but serves only as part of the coil former and as insulator for the winding, but can have the same shape as depicted at the bottom of FIG. 6, although without the three busbars that are depicted in the upper Dart of FIG. 6 and are not needed on lower ring 38.

Figure 6:
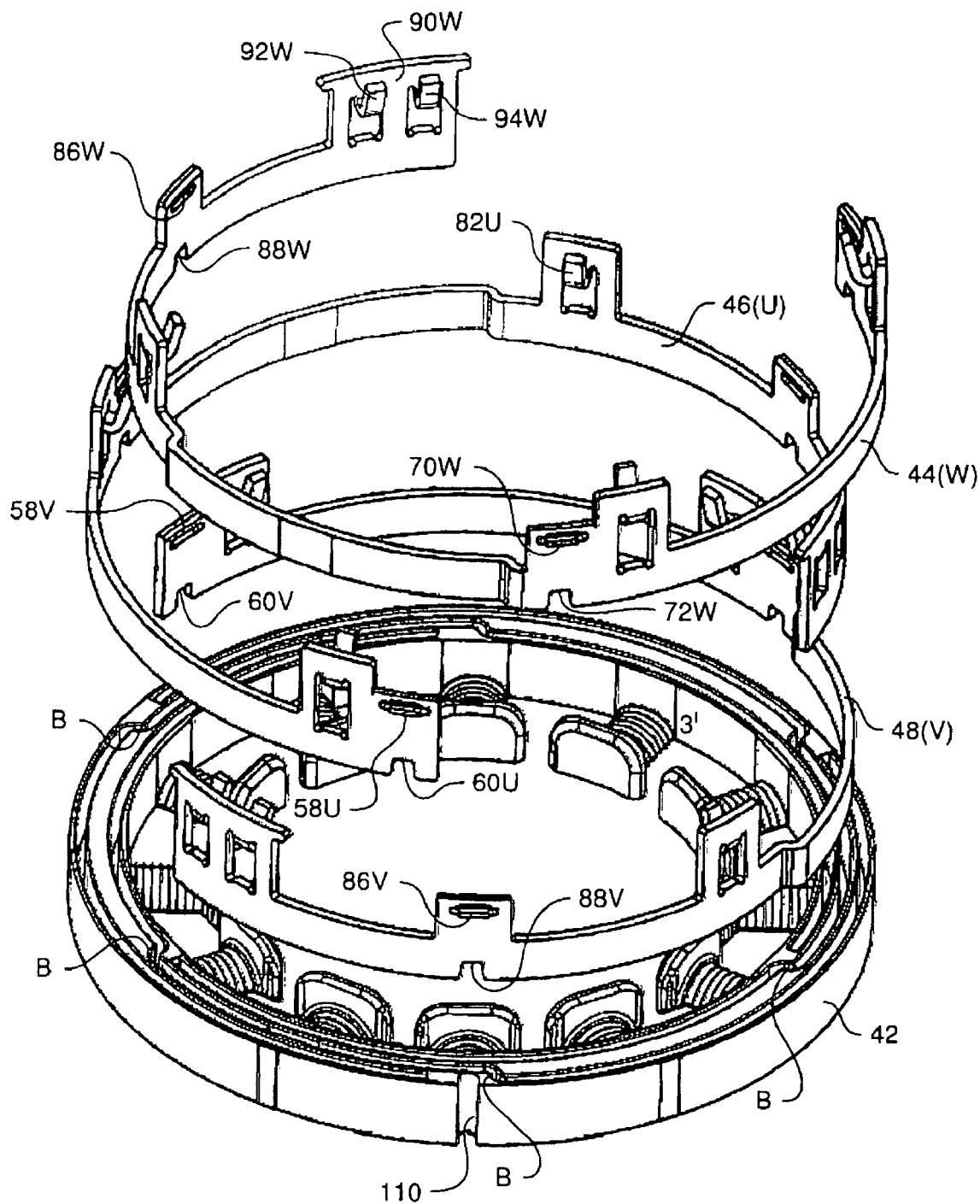
FIG. 6 is a depiction corresponding to the upper part of FIG. 1, but as an exploded view.
Figure 7:
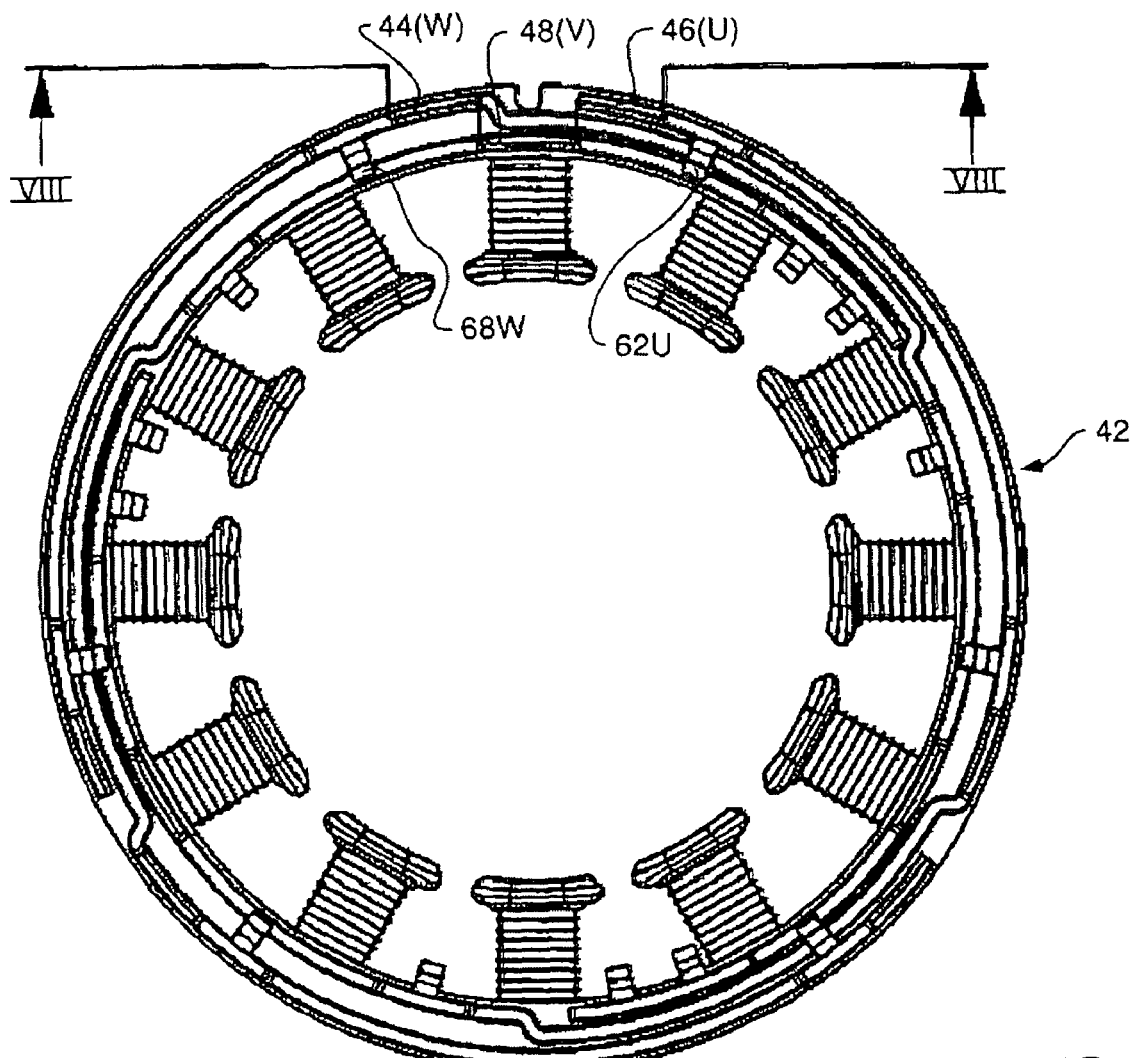
FIG. 7 is a plan view from above of the upper part of FIG. 1, but in the unwound state.

As shown in FIG. 1, FIG. 6, and FIG. 7, there is arranged, at the upper end of stator lamination stack 36, an insulating ring 42 that can also be referred to as an annular disk and that likewise has the function of serving as part of the coil former for the winding, and as an insulator for it. In this embodiment, this upper ring 42 carries three busbars 44, 46, 48 standing on edge, which can be identical but which are offset by an angle of 120° mech. in the manner evident from FIGS. 2, 6, and 7.

Figure 5:
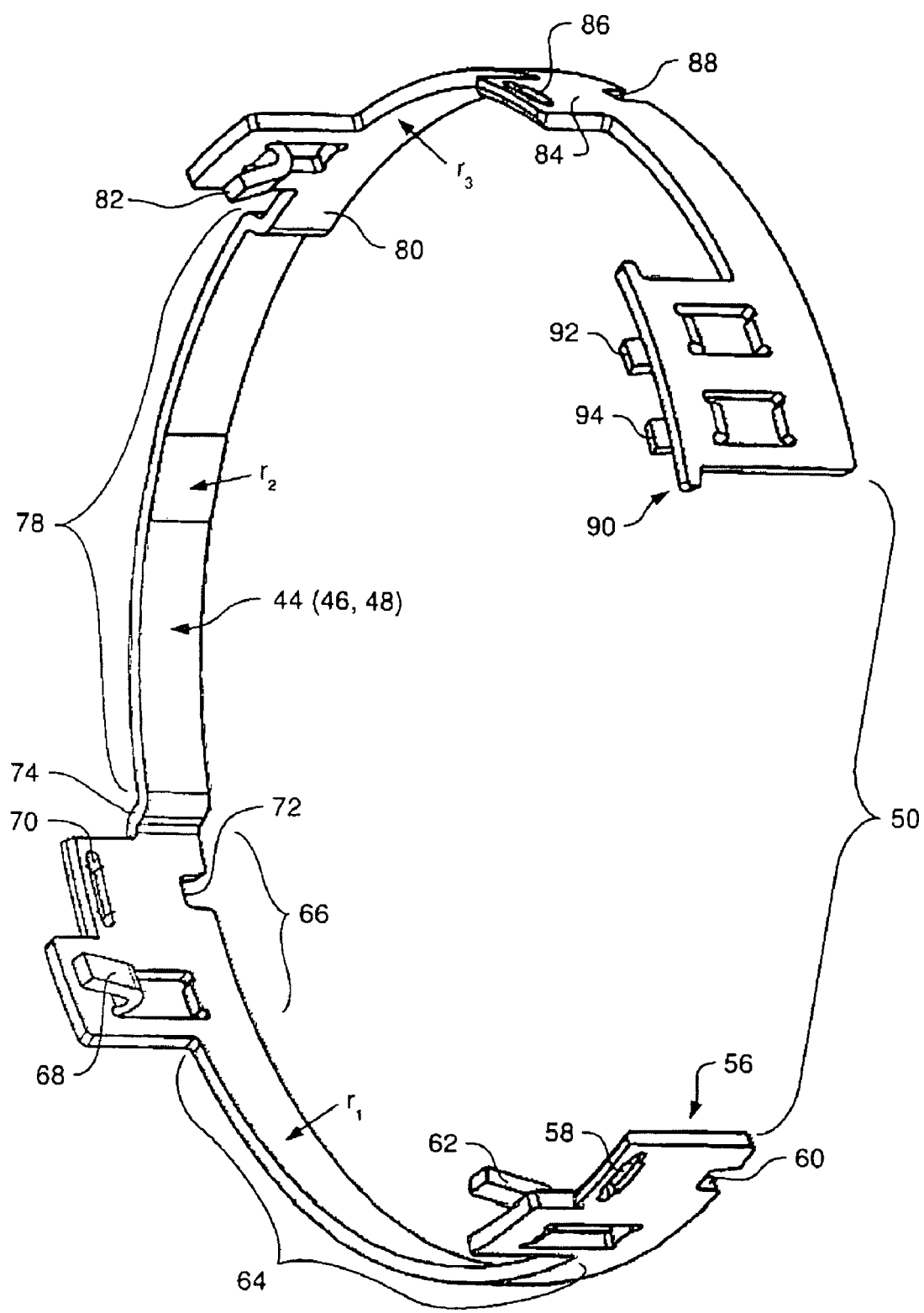
FIG. 5 is a perspective depiction of one of the busbars used in the stator lamination stack of FIG. 1.

FIG. 5 shows busbar 44, which is usually (for practical reasons) implemented identically to busbars 46 and 48; for that reason, the individual busbars contain redundant parts that of course could also be omitted, although in most cases this would increase the cost. Busbars 44, 46, 48 are parts that appear to be simple, but that in terms of their function are based on a long and difficult development process and on numerous inventive steps, since they must satisfy, in an optimal manner, widely varying functional requirements.

In the exemplifying embodiment, each busbar 44, 46, 48 is approximately in the shape of a ring segment and, in this example, extends over approximately 280 to approximately 300° mech., preferably approximately 295° mech.; in other words, each ring has a missing portion 50 that allows the three rings 44, 46, 48 to be ingeniously nested within one another and fastened to prevent rotation relative to one another, and enables the winding wire to be temporarily secured in a simple manner at its ends, and prevents incorrect assembly.

Figure 11:
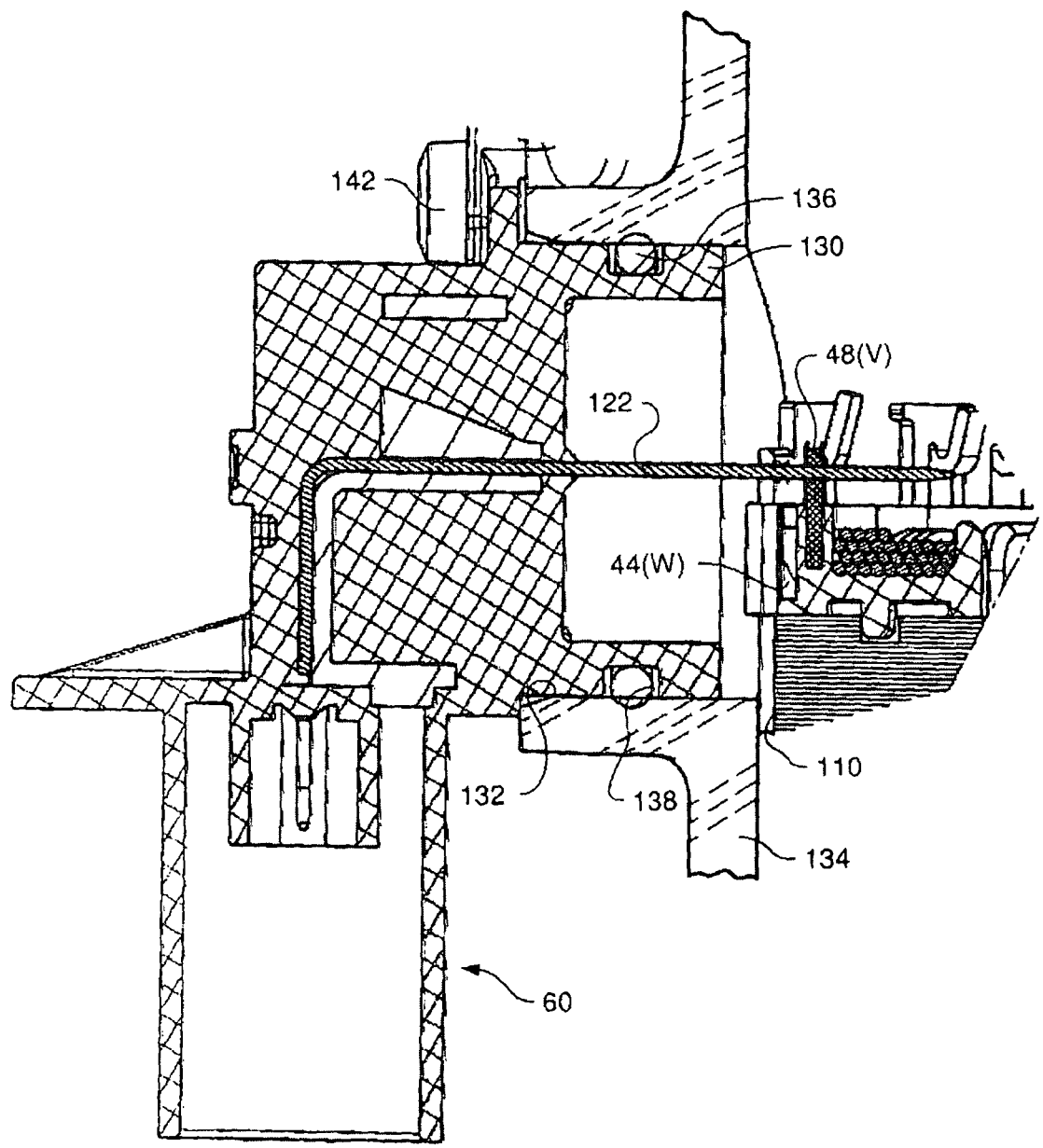
FIG. 11 depicts, in section, a motor having a side-mounted power plug.

As FIG. 5 shows, busbar 44 has on its lower (in FIG. 5) portion 56 an elongated opening 58 that serves for connection to a plug 60, which is depicted in FIG. 11 and serves to supply motor 32 with electrical energy.

Figure 8:
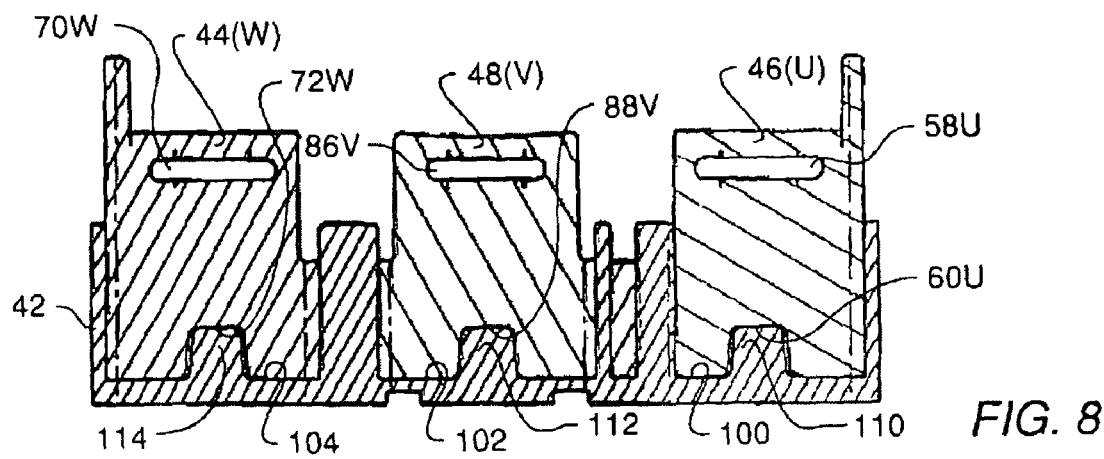
FIG. 8 is a section looking along line VIII-VIII of FIG. 7.

Located approximately opposite this opening 58 is a notch 60 that, as shown in FIG. 8, serves for engagement with a projection 110 of ring 42, thereby preventing the latter from rotating at that location relative to the relevant busbar; in other words, slot 60U of busbar 46 (U) and projection 114 serve to largely immobilize busbar 46 (U) in the vicinity of the associated projection 110, which is advantageous for automated production.

Opening 58 is followed, in the clockwise direction, by a hook 62 that is stamped out of busbar 44 and is bent inward in the manner depicted. During winding, a winding wire 63 is first hooked onto this hook 62 (see FIG. 12) and is then welded to hook 62 by resistance welding; this can be done using an automatic apparatus.

Figure 12:
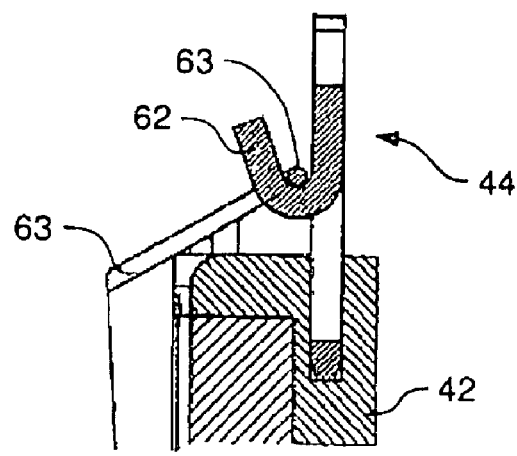
FIG. 12 is an enlarged sectioned depiction of a hook having a winding wire hooked into it.
Figure 13:
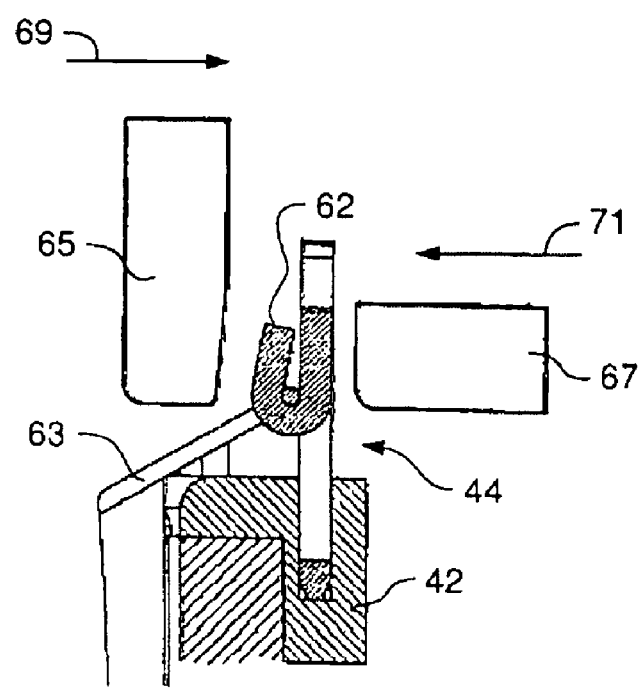
FIG. 13 shows the operation of resistance welding by means of welding tongs.

FIG. 13 shows a resistance welding operation in which lead 63 is welded to hook 62 by means of welding tongs that are closed in the direction of two arrows 69, 71. For that purpose, the two jaws 65, 67 of the welding tongs are guided over hook 62 from above, and then brought against it in the direction of arrow 69, 71. Hook 62 is bent together over lead 63 with the aid of jaws 65, 67, and at the same time is heated by a current flowing through jaws 65, 67. Wire 63 is heated by this current, burning off its insulation. Lead 63 thereby becomes welded to hook 62, and a mechanically stable and electrically highly conductive connection is created. FIGS. 12 and 13 are schematic depictions that indicate ring 42 and the other parts only very roughly, in order to present the working principle of the welding operation in a simple and understandable manner.

Hook 62 is followed by a portion 64, having a length of approximately 60° mech., in which busbar 44 has a rectangular cross section with no particular features. It is followed by a portion 66 having a hock 68, and adjacent thereto an elongated opening 70, a notch 72 being provided in portion 66.

Portion 66 is followed by a bending point 74 at which radius r1 of portion 64 decreases to a somewhat smaller radius r2 of a portion 78 that, like portion 64, has an angular extension of approximately 60° mech. Portion 78 extends as far as a bending point 80 where radius r2 of portion 78 decreases to a somewhat smaller radius r3.

Bending points 74, 80 are guided into corresponding complementary cavities B of ring 33, which are depicted in the lower part of FIG. 6. They prevent rings 44, 46, 48 from being inserted into ring 42 in any positions other than the predetermined ones.

Bending point 80 is followed in the clockwise direction in FIG. 5 by a hook 82, and then, with a spacing of approximately 40° mech. from hook 82, by a portion 84 that protrudes upward from busbar 44 and has an elongated opening 86 that, here as well, is located opposite a notch 88.

Portion 84 is once again followed in a clockwise direction, and with an angular spacing of approximately 45° mech., by an upwardly protruding portion 90 on which two hooks 92, 94 are provided. There the relevant busbar 44, 46, 48 ends.

Hooks 62, 68, 82, 92, and 94 protrude into the interior of the relevant busbar 44, 46, or 48. During automated winding, winding wire 63 is hooked onto these hooks and then welded to the relevant busbar, the insulation of wire 63 being burned off by the heat produced during welding, so that a good electrical connection is produced.

Because busbars 44 (W), 46 (U), and 48 (V) shown in FIG. 6 can be identical, their elements are labeled with the same reference characters as in FIG. 5 but indexed with U, V, or W (for example, 68J, 68V, or 68W) so that the depiction does not become too complicated.

In the present embodiment, the entire winding for all phases is wound from a single, uninterrupted wire segment 63 whose one end 63A is electrically and mechanically connected to hook 92W of part 90W, and then passes through all twelve coils 8', 9', 10', 11', 12', 1', 2', 3', 4', 5', 6', and 7' to its other end 63B. End 63B is electrically and mechanically connected to hook 94W of part 90W, so that winding wire 63 is preferably continuous.

From hook 92W wire 63 goes to coil 8', and from there on to hook 62V. From there it continues to coil 9' and from there on to hook 68U, and from there to coil 10'. From there wire 63 goes to hook 82W, and from there to coil 11', and from that to hook 94V. Hook 92V of busbar 48 is not used and is consequently redundant.

From hook 94V wire 63 continues to coil 12', and from that to hook 62U, and on to coil 1'. From that, wire 63 continues to hook 68W, and from there via coil 2' to hook 82V and on, via coil 3', to hook 94U. Hook 92U is not used on this busbar.

Figure 3:
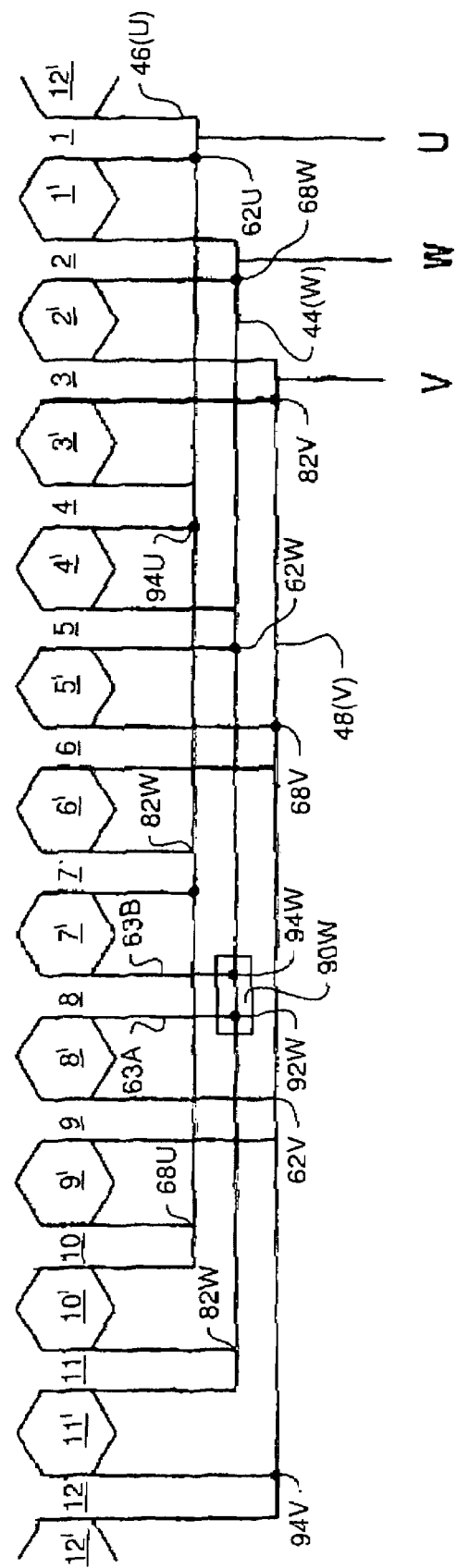
FIG. 3 is a winding diagram for the stator winding depicted in FIG. 1.

From hook 94U, the winding proceeds via coil 4' to hook 62W, and from there via coil 5' to hook 68V, and from there continues via coil 6' to hook 82W, and then via coil 71 to wire end 63B (FIG. 3) and to hook 94W.

In this manner, the entire winding can be wound automatically and also connected automatically to the associated hooks.

The result is the circuit according to FIG. 4, i.e. the example refers to a quadruply parallel delta winding that is especially suitable for low-voltage drive systems. Between terminals V and W, for example, the four coils 2', 5', 8', and 11' are connected in parallel, and the result is analogous for the other phase terminals as indicated in FIG. 4.

Because the currents in stator winding arrangement 30 can be substantial, it is important to make low-impedance connections available throughout the motor (or generator).

Figure 9:
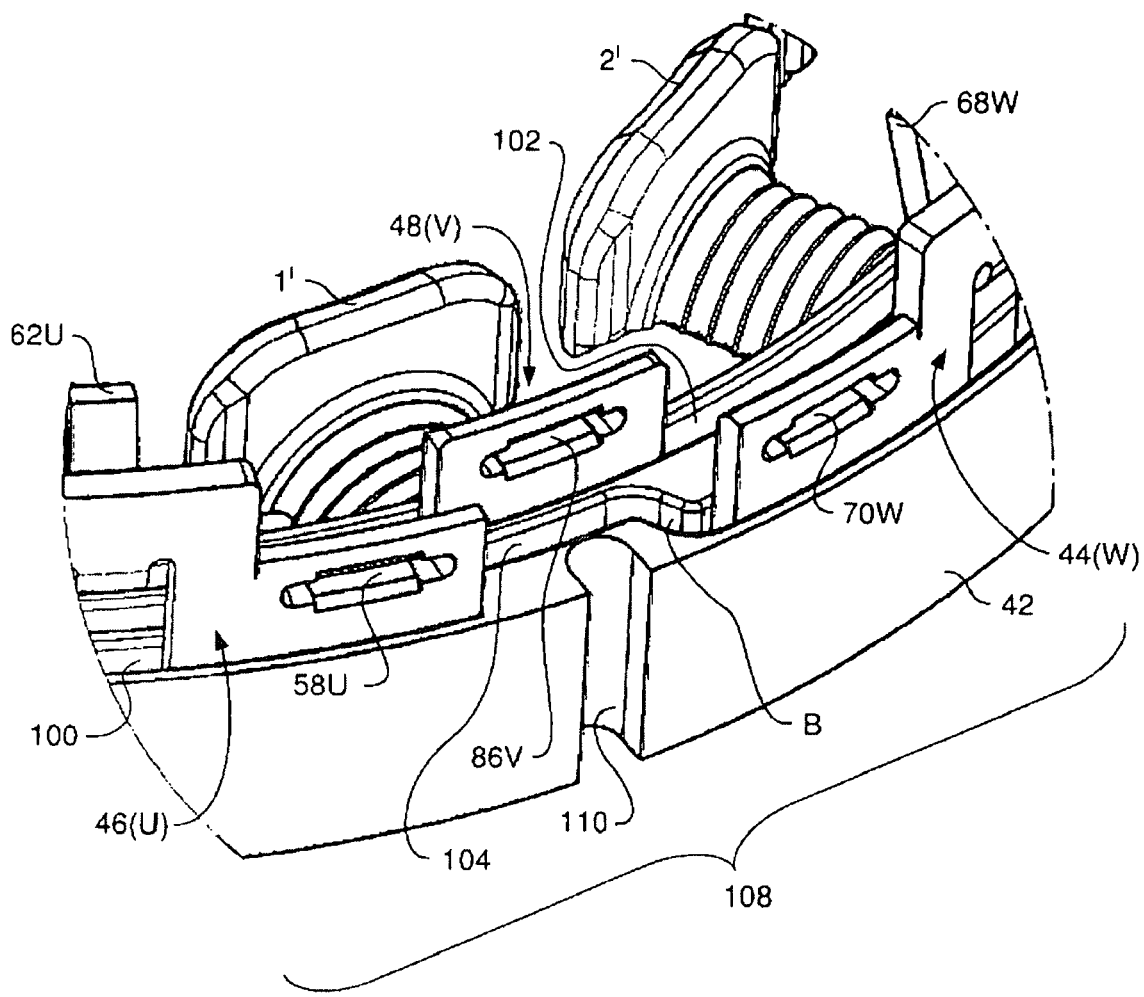
FIG. 9 is a three-dimensional depiction of details of an end ring.

FIG. 9 is a perspective depiction of part of upper insulating ring 42. The latter has a cavity 100 for the reception of busbar 46 (U), a cavity 102 for the reception of busbar 48 (V), and a cavity 104 for the reception of busbar 44 (W). The busbars are pressed into these cavities and retained therein. Because of the heating that occurs during welding, part 42 is preferably crosslinked by radiation so that it can withstand these elevated temperatures.

Figure 2:
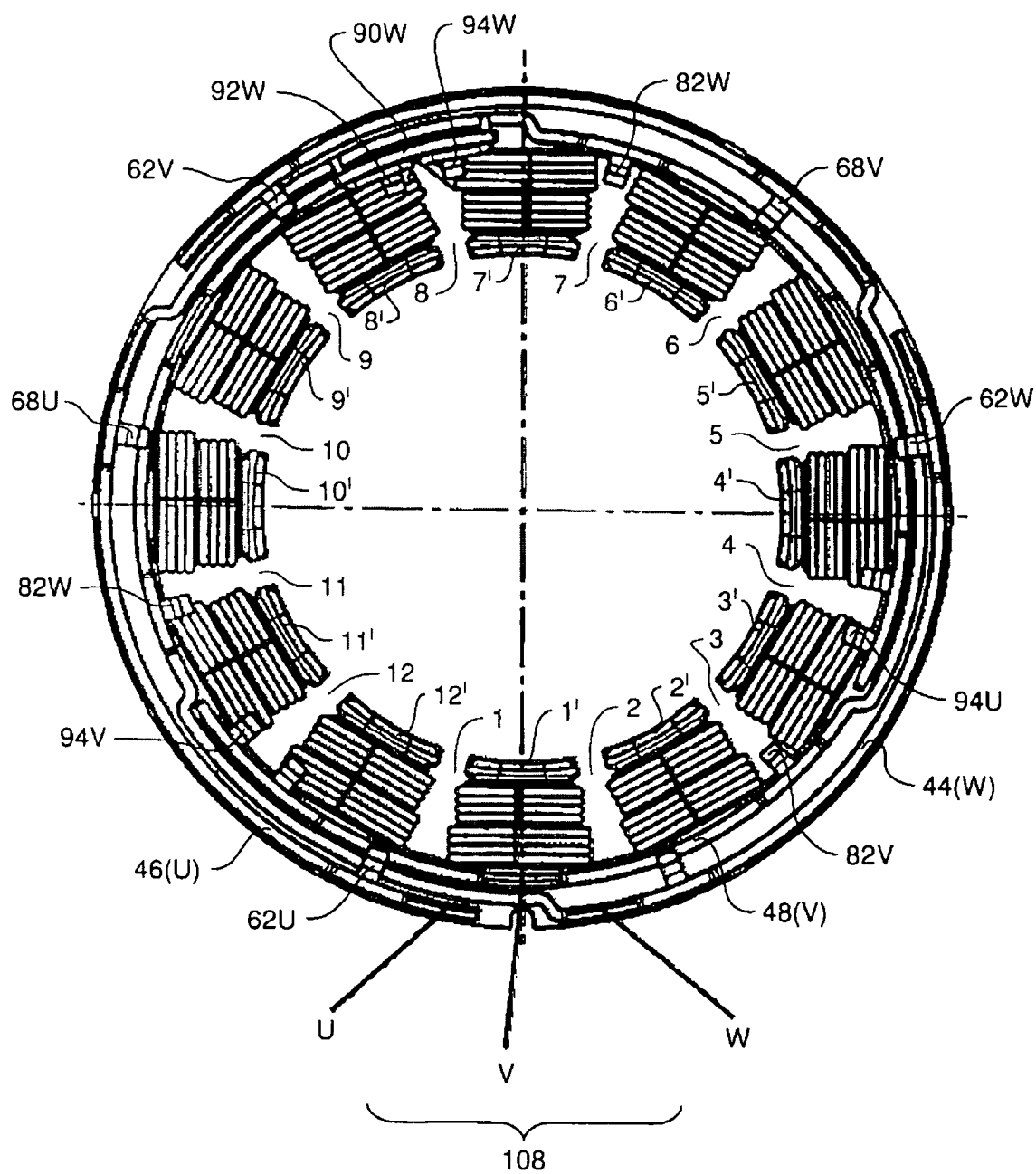
FIG. 2 is a plan view from above of the arrangement according to FIG. 1.

In a predetermined angular region 108 that is depicted in FIGS. 1, 2, and 9, insulating ring 42 has a marking 110 (here, for example, in the form of an elongated slot), and in this region 108 the three busbars 44, 46, 48 are secured in the circumferential direction by special projections.

A projection 112 (FIG. 8) at the bottom of cavity 102 secures busbar 48 (V) in the circumferential direction in cavity 102, by engaging positively into slot 88V of busbar 48. As a result, busbar 48 is precisely immobilized in the circumferential direction in angular region 108, which proves extremely advantageous for further automatic processing.

A projection 114 (FIG. 8) at the bottom of cavity 104 secures busbar 44 (W) in the circumferential direction in cavity 104 by engaging into slot 72W of busbar 44 (W).

A projection 110 (FIG. 8) at the bottom of cavity 100 secures busbar 46 (U) in cavity 100 by engaging positively into slot 60U (FIG. 8) of busbar 46 (U).

Figure 10:
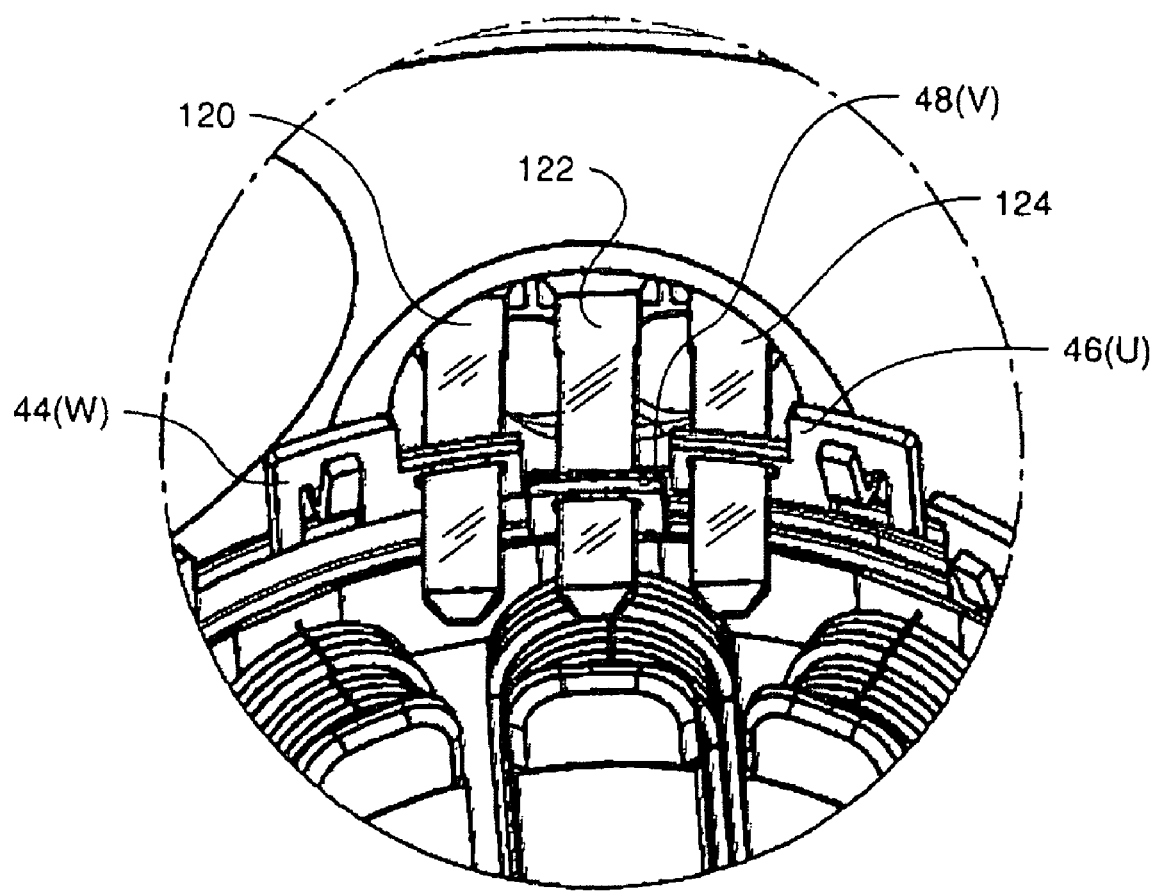
FIG. 10 is a three-dimensional depiction of the electrical connection of a power plug to the end ring.

As a result, the elongated openings 70W, 86V, and 58U of FIG. 9 have a precisely defined position relative to one another and relative to elongated slot 110 (FIG. 9), so that three flat conductors 120, 122, 124 of a lateral power plug 60 can be inserted into these elongated openings according to FIG. 10, as shown in FIG. 10; and these flat conductors 120, 122, 124 can then be electrically and mechanically connected to busbars 44, 46, 48, for example by laser welding, as depicted in FIG. 11.

Flat conductors 120, 122, 124 are retained in power plug 60 by injection molding (see FIG. 11), and they enable a low-impedance connection from plug 60 to stator 30; this connection can be produced in a largely or completely automated manner.

Power plug 60 is inserted, with a cylindrical part 130, into a cylindrical opening 132 of a motor housing 124. This housing 134 is depicted only partially in FIG. 11. An O-ring 136 is inserted into an annular groove 138 of cylindrical part 130 and serves for sealing between the latter and motor housing 134. Motor plug 60 is mounted on motor housing 134 by two screws, of which screw 142 is visible in FIG. 11.

During manufacture, firstly the three busbars 44, 46, 48 are pressed into the cavities 100, 102, 104 in order to retain them there securely and achieve highly precise positioning of these busbars in angular region 108. Stator 30 is then wound, usually with an automatic winder, and winding wire 63 is welded to the various hooks into which it is hooked, as depicted by way of example in FIGS. 12 and 13.

Power plug 60 is then installed by inserting flat conductors 120, 122, 124 laterally into elongated openings 70U, 86V, and 58W and welding them there. The bearing bells (not depicted) are installed, together with the shaft and rotor 34. Because these parts are not directly related to the present invention, they are depicted only schematically.

Numerous variants and modifications are of course possible within the scope of the present invention.

What is claimed is:

1. An electronically commutated motor, comprising
a rotor (34) that is rotatable about an imaginary axis (D),
a stator arrangement in which is provided a number, evenly divisible by the number three or by an integral multiple thereof, of salient stator poles, associated with which are coils (1' to 12') that have associated with them, for electrical connection thereof,
busbars (44, 46, 48), arranged on edge, that are arranged in an insulating part (42), which busbars each have a central portion (78) that runs circumferentially at a medium radial spacing (r2) from the imaginary axis (D) of the rotor (34), and a first end portion (90) that proceeds at a first radial spacing (r3) from the imaginary axis (D), which radial spacing (r3) is smaller than the medium radial spacing (r2), which first segment (90) transitions via a first deflection point (80) into the central portion (78), and a second end portion (64) that proceeds at a second radial spacing (rl) from the imaginary axis (D), which second radial spacing is larger than the medium radial spacing (r2) and transitions via a second deflection point (74) into the central portion (78),
wherein
said motor has, when viewed along said rotor axis, a first angular region or sector, and a second angular region or sector;
in said first angular region (108), each of the busbars (44, 46,48) is equipped with a connection capability (58U, 86V, 70W) for an associated electrical connector (120, 122, 124) proceeding in a direction away from the motor (32);
said busbars (44, 46, 48) are insulated from one another and nested into one another, a radially outer second portion (64) of a first busbar (44, 46, 48) is extending, at said first angular region (108), as far as the vicinity of a first deflection point (74), located there, of a second busbar directly adjacent to that portion at that deflection,
wherein, in at least said second angular region, diameters of adjacent portions of said busbars are stepped, with respect to each other, such that a radially inwardly located first end portion of a first busbar (W), a radially middle portion (78) of a second busbar (U) and a radially outwardly located end portion (64) of a third busbar (V) run circumferentially, side-by-side each other, from a beginning of to an end of said second angular region;
wherein displacement of the aforesaid busbars (44, 46, 48) in a circumferential direction is mechanically limited in said first angular region (108),
wherein hooks (62, 68, 82, 92, 94), for hooking in elements (63) of the stator winding, are provided on each of the busbars, and
wherein those hooks (62U, 68W), which serve to hook in elements of the stator winding for the stator poles of the first angular region (108), are located outside of said first angular region (108).

2. The motor according to claim 1, wherein
the electrical connector (120, 122, 124) is implemented as a flat connector, and
in the busbar (44, 46, 48) associated therewith, an opening complementary to said flat connector is provided, for insertion of that flat connector (120, 122, 124) from a location radially outside of said busbar.

3. The motor according to claim 2, wherein
a weld connection is provided between a busbar (44, 46, 48) and the flat connector (120, 122, 124) associated with it.

4. The motor according to claim 1, wherein
the respective radii of said adjacent portions of said first, second and third busbars (U, V, W) are selected such that a radially innermost portion has a smallest radius r3, a radially intermediately located portion has an intermediate radius r2, and a radially outermost portion has a largest radius r1, and
said first and second deflection points (74, 80), between radially differing portions of each respective busbar, serve as detents against any circumferential displacement of another busbar nested thereagainst, thereby achieving said mechanical limitation.

* * * * *